United States Patent
Swift

(10) Patent No.: US 6,798,087 B1
(45) Date of Patent: Sep. 28, 2004

(54) ROTARY-LINEAR ACTUATOR SYSTEM, METHOD OF MANUFACTURING AND METHOD OF USING A ROTARY-LINEAR ACTUATOR

(75) Inventor: Gerald L. Swift, Yaphank, NY (US)

(73) Assignee: Anorad Corporation, Shirley, NY (US)

( * ) Notice: Subject to any disclaimer, the term of this patent is extended or adjusted under 35 U.S.C. 154(b) by 67 days.

(21) Appl. No.: 10/041,317

(22) Filed: Jan. 8, 2002

(51) Int. Cl.[7] .............................................. H02K 41/00

(52) U.S. Cl. ........................................ 310/12; 310/13

(58) Field of Search .............................. 310/12, 13, 14, 310/112

(56) References Cited

U.S. PATENT DOCUMENTS

| | | | |
|---|---|---|---|
| 5,952,744 A | | 9/1999 | Chitayat ....................... 310/12 |
| 5,959,374 A | * | 9/1999 | Anderson et al. .............. 310/13 |
| 5,982,053 A | | 11/1999 | Chitayat ....................... 310/13 |
| 6,137,195 A | | 10/2000 | Chitayat ....................... 310/13 |
| 6,215,206 B1 | * | 4/2001 | Chitayat ....................... 310/12 |

* cited by examiner

*Primary Examiner*—Dang Le
*Assistant Examiner*—Nguyen N Hanh
(74) *Attorney, Agent, or Firm*—Amin & Turocy, LLP; John M. Miller

(57) ABSTRACT

A rotary-linear actuator system, method of manufacturing and method of using a linear actuator are provided. An aspect of the invention includes a rotary-linear actuator having a spindle assembly and a housing assembly. The spindle assembly includes a plurality of annular magnets and a plurality of bar magnets affixed to a rotor. The plurality of annular magnets can be arranged with alternating polarity. The plurality of bar magnets can likewise be arranged with alternating polarity. The housing assembly includes a first set of coil(s) and a second set of coil(s).

The spindle assembly can be movable and/or rotatable along a longitudinal axis extending through the spindle assembly. The first set of coil(s) can be arranged to, when energized, interact with at least one of the plurality of annular magnets to move the spindle assembly in a linear mode. Further, the second set of coil(s) can be arranged to, when energized, interact with a least one of the bar magnets to move the spindle assembly in a rotation mode. Thus, by selectively energizing one or more of the first set of coil(s) and/or the second set of coil(s), a linear and/or rotation motive force can be generated on the spindle assembly by interacting with fields generated by the plurality of annular magnets and/or the plurality of bar magnets.

19 Claims, 9 Drawing Sheets

ROTARY-LINEAR ACTUATOR SYSTEM, METHOD OF MANUFACTURING AND METHOD OF USING A ROTARY-LINEAR ACTUATOR

TECHNICAL FIELD

The present invention relates to the art of rotary-linear actuators and more particularly to a rotary-linear actuator system, methods of manufacturing and methods of using a rotary-linear actuator.

BACKGROUND OF THE INVENTION

Rotary-linear actuators are used in a variety of industrial and manufacturing settings to provide precise, repeatable action(s). There is a need in the field for rotary-linear actuators that provide high accuracy, low weight, large load-carrying capacity, compact size, smooth operation and cost-effectiveness.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for a rotary-linear actuator having a spindle assembly including a plurality of annular magnets and a plurality of bar magnets. The plurality of annular magnets and the plurality of bar magnets can be mounted on a rotor generally surrounding a support. The rotary-linear actuator can further include a housing assembly having a motor shell, a first set of coils and a second set of coils.

The plurality of annular magnets can be arranged with alternating polarity—substantially half of the annular magnets oriented so that their north poles point radially outward and a substantially equal number oriented so that their north poles point radially inward. Similarly, the plurality of bar magnets can be arranged longitudinally along the rotor with alternating polarity—substantially half of the bar magnets oriented so that their north poles point radially outward and substantially equal number oriented so that their north poles point radially inward.

The first set of coil(s) can comprise one or more coil(s), the density and size chosen based on the application. The first set of coil(s) can be arranged to, when energized, interact with the spindle assembly in a linear mode. Similarly, the second set of coil(s) can comprise one or more coil(s), the density and size chosen based on the application. The second set of coil(s) can be arranged to, when energized, interact with the spindle assembly in a rotational mode.

The spindle assembly can be movable and/or rotatable along a longitudinal axis extending through the rotor. The first set of coil(s) can be arranged to, when energized, interact with at least one of the plurality of annular magnets. Likewise, the second set of coil(s) can be arranged to, when energized, interact with at least one of the plurality of bar magnets. By selectively energizing one or more of the first set of coil(s), a linear motive force can be generated on the spindle assembly by interacting with the field generated by the plurality of annular magnets. Similarly, by selectively energizing one or more of the second set of coil(s), a rotational motive force can be generated on the spindle assembly by interacting with the field generated by the plurality of bar magnets.

Another aspect of the present invention provides for the spindle assembly to include an air bearing allowing an appropriate clearance for the spindle assembly to move. Further, one or more of the annular magnets can comprise a plurality of component magnets.

Another aspect of the present invention provides for the rotary-linear actuator to include a scale assembly, a first encoder and/or a second encoder. For example, the scale assembly can be placed over at least a portion of some of the plurality of bar magnets. The scale assembly can be etched with a pattern of reflective and non-reflective region(s) that are scanned by the first encoder and/or the second encoder to register movement of the spindle assembly. The first encoder can sense a linear position of the spindle assembly. The second encoder can sense a rotational position of the spindle assembly. The first encoder can provide a signal indicative of the linear position of the spindle assembly (e.g., to a control system). The second encoder can provide a signal indicative of the rotational position of the spindle assembly (e.g., to a control system).

Yet another aspect of the present invention provides for methods for manufacturing a rotary-linear actuator having annular magnets and bar magnets and methods of using a rotary-linear actuator having annular magnets and bar magnets.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
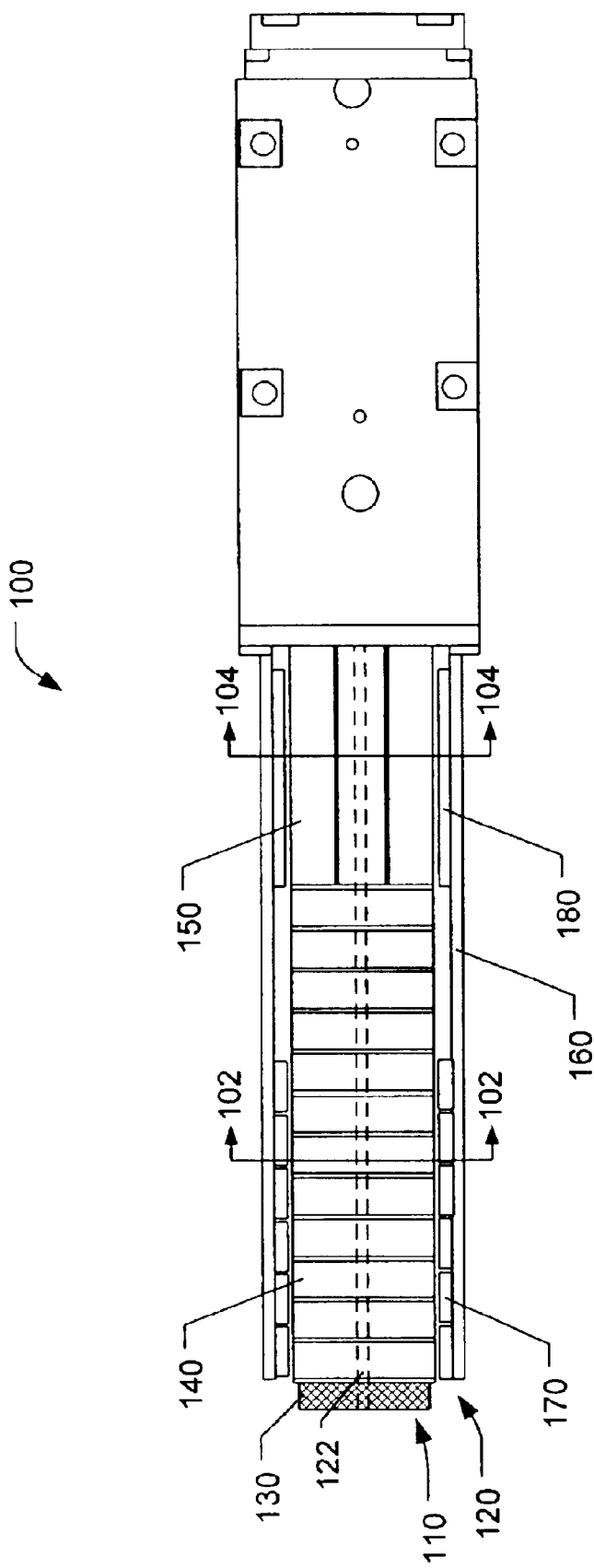
FIG. 1 is a cross-section of a rotary-linear actuator in accordance with an aspect of the present invention in which a spindle assembly is shown a first position.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details.

Referring to FIG. 1, a cross-section of a rotary-linear actuator 100 in accordance with an aspect of the present invention is illustrated. The rotary-linear actuator 100 includes a spindle assembly 110 and a housing assembly 120. The spindle assembly 110 includes a rotor 130, a plurality of annular magnets 140 and a plurality of bar magnets 150. The housing assembly 120 includes a motor shell 160, a first set of coil(s) 170 and a second set of coil(s) 180.

The plurality of annular magnets 140 can be arranged surrounding at least a portion of the rotor 130. For example, the plurality of annular magnets 140 can be arranged with alternating polarity—substantially half of the annular magnets 140 oriented so that their north poles point radially outward and a substantially equal number oriented so that their north poles point radially inward. One or more of the plurality of annular magnets 140 can be disposed conformably about at least a portion of the rotor 130. Further, one or more of the plurality of annular magnets 140 can have an inner portion at least partially disposed conformably about the rotor 130.

Next, the plurality of bar magnets 150 can be arranged surrounding at least a portion of the rotor 130. For example, the plurality of bar magnets 150 can be arranged longitudinally along the rotor 130 with alternating polarity—substantially half of the bar magnets 150 oriented so that their north poles point radially outward and substantially equal number oriented so that their north poles point radially inward.

The first set of coil(s) 170 can comprise one or more coil(s), the density and size chosen based on the application. The first set of coil(s) 170 can be manufactured by winding the coil(s) 170 in a standard manner (e.g., using copper wire surrounded by a heat-actuated glue). For example, a current can be applied to the coil(s) 170 and the coil(s) 170 bent in a jig or mold to the proper shape. After the coil(s) 170 cool, they retain their curved shape. The coil(s) 170 can then be inserted in slots in the motor shell 160 and varnish or epoxy applied to the coil(s) 170. Voids can be filled with epoxy. The surface adjacent the coil(s) 170 can then be machined appropriately to form a surface with the proper dimensions. The first set of coil(s) 170 can be arranged to, when energized, interact with the spindle assembly 110 in a linear mode.

Similarly, the second set of coil(s) 180 can comprise one or more coil(s), the density and size chosen based on the application. The second set of coil(s) 180 can be manufactured in a manner similar to the first set of coil(s) described infra. The second set of coil(s) 180 can be arranged to, when energized, interact with the spindle assembly 110 in a rotational mode.

The spindle assembly 110 can be movable and/or rotatable along a longitudinal axis extending through the spindle assembly 110. The first set of coil(s) 170 can be arranged to, when energized, interact with least one of the plurality of annular magnets 140. Likewise, the second set of coil(s) 180 can be arranged to, when energized, interact with at least one of the plurality of bar magnets 150. By selectively energizing one or more of the first set of coil(s) 170, a linear motive force can be generated on the spindle assembly 110 by interacting with the field generated by the plurality of annular magnets 140. Similarly, by selectively energizing one or more of the second set of coil(s) 180, a rotational motive force can be generated on the spindle assembly 110 by interacting with the field generated by the plurality of bar magnets 150. FIG. 1 illustrates the spindle assembly 110 in a first position and FIG. 2 illustrates the spindle assembly 110 in a second position.

Figure 2:
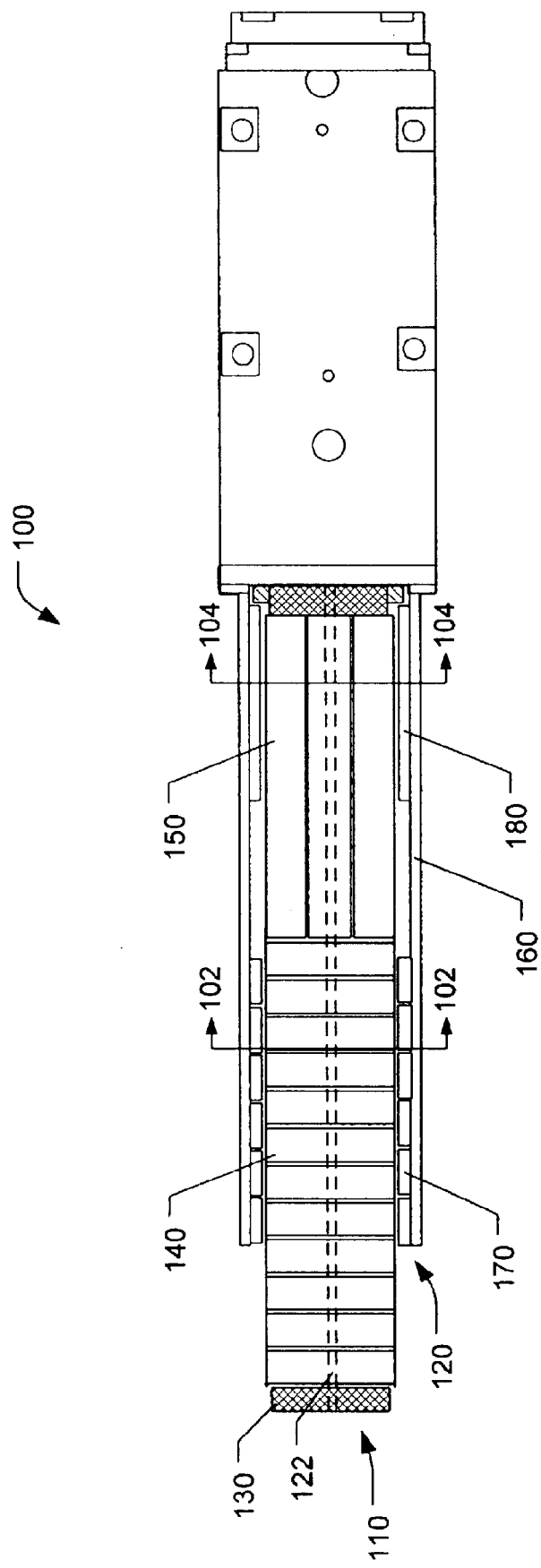
FIG. 2 is a cross-section of the rotary-linear actuator of FIG. 1 in which the spindle assembly is shown in a second position.
Figure 3:
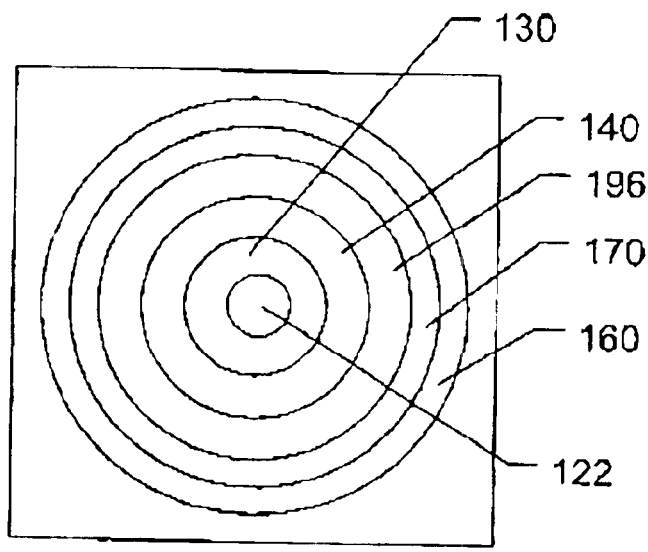
FIG. 3 is a cross-section taken along line 102—102 of the rotary-linear actuator of FIG. 1 and FIG. 2.

Referring next to FIG. 3, a cross-section taken along line 102—102 of the rotary-linear actuator 100 of FIG. 1 and FIG. 2 is illustrated. The rotary-linear actuator 100 includes the support 122 substantially surrounded by an air bearing 196. The rotary-linear actuator 100 further includes the rotor 130 substantially surrounded by the plurality of annular magnets 140. The plurality of annular magnets 140 are likewise substantially surrounded by one of the first set of coil(s) 170. The motor shell 160 generally surrounds the first set of coil(s) 170.

Figure 4:
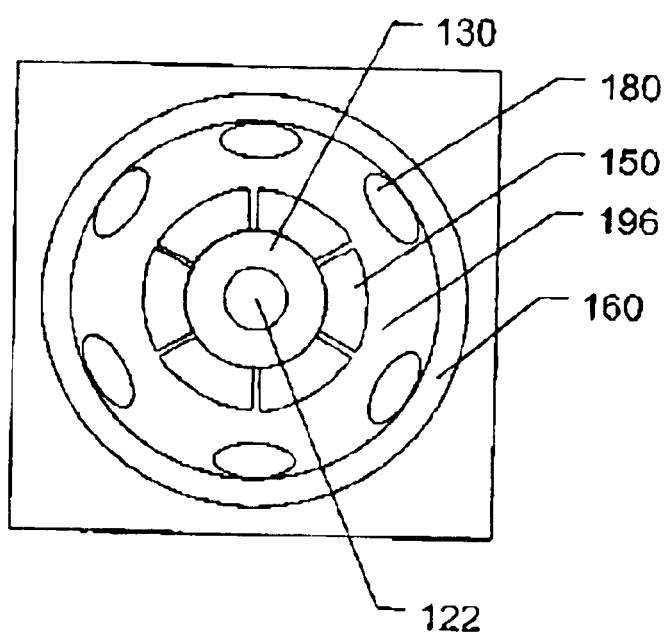
FIG. 4 is a cross-section taken along line 104—104 of the rotary-linear actuator of FIG. 1 and FIG. 2.

Turning to FIG. 4, a cross-section taken along line 104—104 of the rotary-linear actuator 100 of FIG. 1 and FIG. 2 is illustrated. The rotary-linear actuator 100 includes the support 122 substantially surrounded by an air bearing 196. The rotary-linear actuator 100 further includes the rotor 130 substantially surrounded by the plurality of bar magnets 150. The plurality of bar magnets 150 are likewise substantially surrounded by the second set of coil(s) 180. The motor shell 160 generally surrounds the second set of coil(s) 180.

Figure 5:
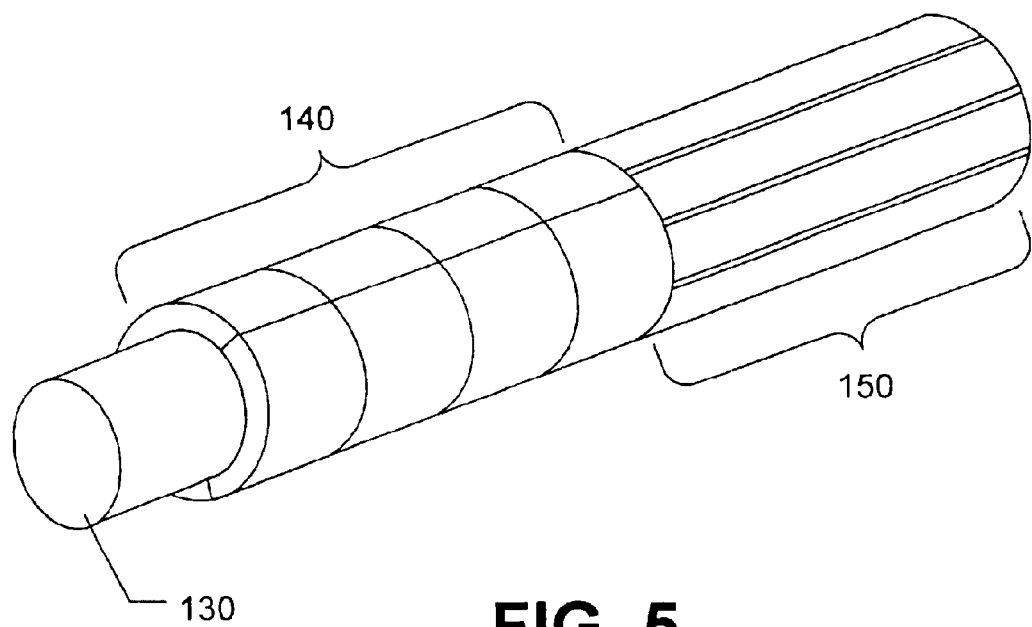
FIG. 5 is a view of an arrangement of annular magnets and bar magnets in accordance with an aspect of the present invention.

Referring next to FIG. 5 a view of an arrangement of annular magnets 140 and bar magnets 150 in accordance with an aspect of the present invention is illustrated. The annular magnets 140 and bar magnets 150 are affixed to the rotor 130. Further, appropriate spacer(s) (not shown) can be placed between the annular magnets 140 and/or the bar magnets 150 in order to achieve design goal(s), for example, appropriate travel and/or rotation speed.

Figure 6:
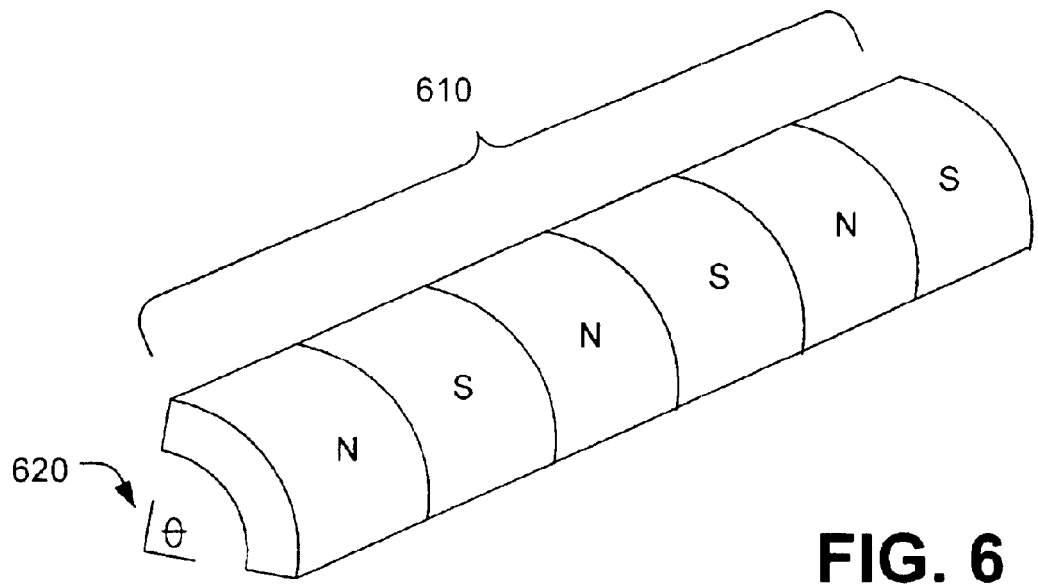
FIG. 6 is a view of exemplary annular magnets in accordance with an aspect of the present invention.

Next, turning to FIG. 6, a view of an arrangement of a plurality of annular magnets 610 in accordance with an aspect of the present invention is illustrated. Each of the plurality of annular magnets 610 has an arc angle θ 620. The arc angle θ 620 can be in the range of about 45 degrees to about 360 degrees.

For example, in the instance where θ 620 is about 120 degrees, three magnets 610 would surround a rotor (not shown) in order to form a substantially complete ring. Alternatively, in the instance where θ 620 is about 180 degrees, two magnets 610 can be utilized. In another example, the magnets 610 forming a substantially complete ring are substantially equal, while in yet another example, the magnets forming a substantially complete ring are not equal (e.g., 240 degrees and 120 degrees). These examples are for illustration only—it is to be appreciated that any suitable arrangement of annular magnets (e.g., surrounding a rotor) is encompassed by the present invention. Further, in accordance with another aspect of the present invention, the magnets do not need to form a substantially complete ring about the rotor (e.g., spacer(s) included).

Figure 7:
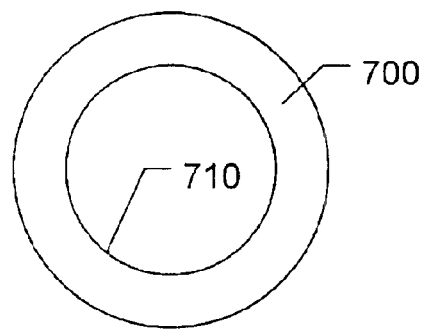
FIG. 7 is a view of an exemplary annular magnet in accordance with an aspect of the present invention.

Turning briefly to FIG. 7, a view of an exemplary annular magnet 700 in accordance with an aspect of the present invention is illustrated. The annular magnet 700 is a single piece, the inner surface 710 of which forms an opening (e.g., to surround a rotor). While the inner surface 710 is depicted as circular, it is to be appreciated that any suitable inner surface 710 is encompassed by the present invention. For example, the inner surface 710 can be square in order to be placed fixably around a core having a substantially square outer surface (not shown).

Figure 8:
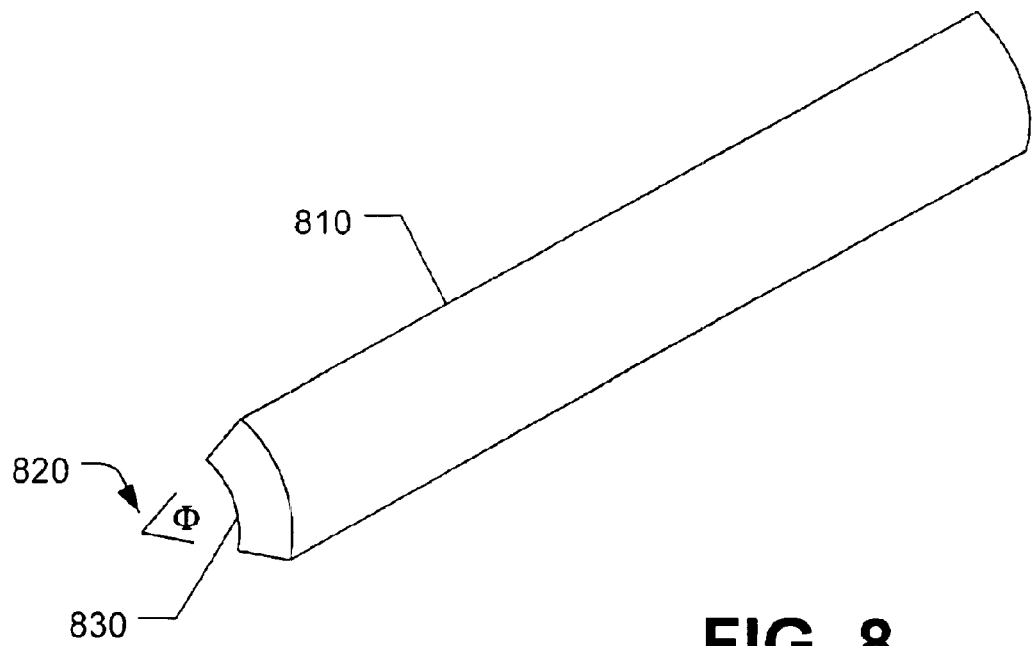
FIG. 8 is a view of an exemplary bar magnet in accordance with an aspect of the present invention.

Referring next to FIG. 8, a view of an exemplary bar magnet 810 in accordance with an aspect of the present invention is illustrated. The bar magnet 810 has an inner arc angle F 820. The arc angle F 820 can be in the range of about 15 degrees to about 180 degrees. It is to be appreciated that any suitable arrangement of bar magnets (e.g., surrounding a rotor (not shown)) is encompassed by the present invention. Further, in accordance with another aspect of the present invention, the bar magnets do not need to substantially encompass the rotor. The bar magnet 810 can have an inner surface 830 which confirms to a rotor.

Figure 9:
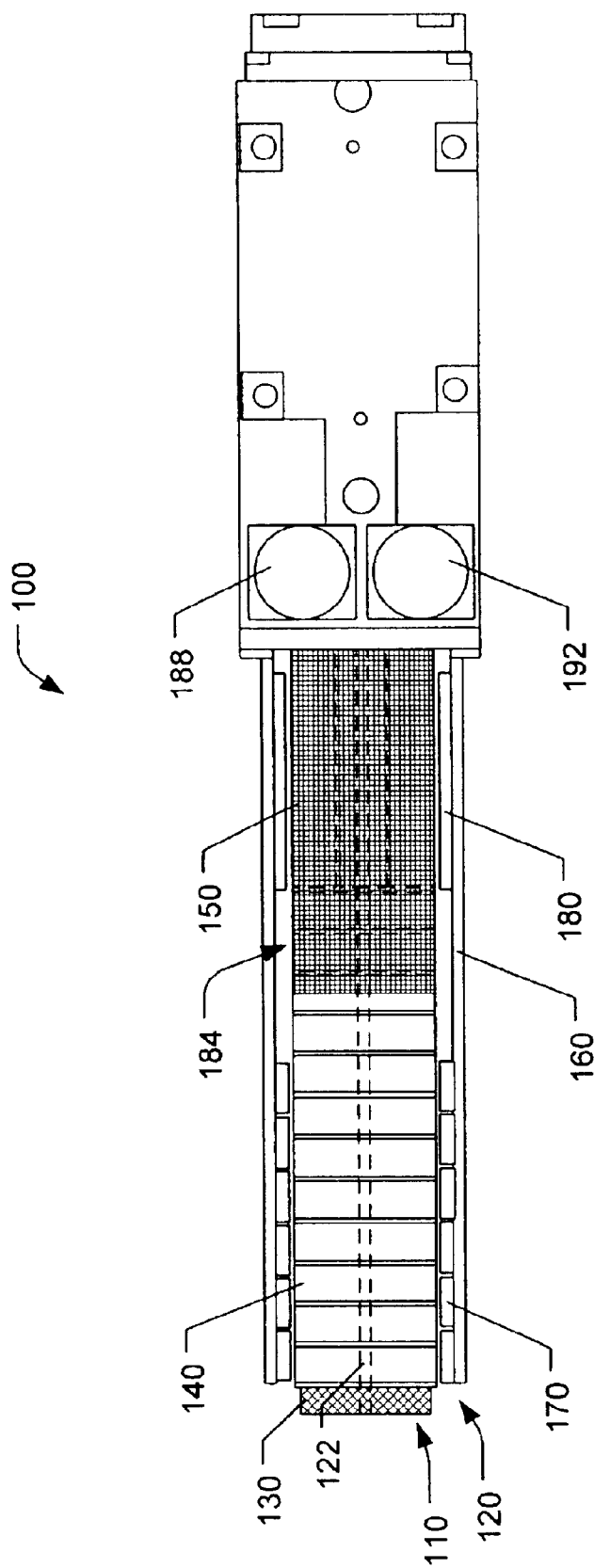
FIG. 9 is a cross-section of a rotary-linear actuator employing a scale and encoders in accordance with an aspect of the present invention.

Turning to FIG. 9, a cross-section of the rotary-linear actuator 100 having an optional scale assembly 184, a first encoder 188 and a second encoder 192 in accordance with an aspect of the present invention is illustrated. For example, the scale assembly 184 can be placed over at least a portion of some of the bar magnets 150 and/or annular magnets 140. The scale assembly 184 can be etched with a pattern of reflective and non-reflective region(s) that are scanned by the first encoder 188 and/or the second encoder 192 to register movement of the spindle assembly 110. The first encoder 188 can sense a linear position of the spindle assembly 110. The second encoder 192 can sense a rotational position of the spindle assembly 110. The first encoder 188 can provide a signal indicative of the linear position of the spindle assembly 110 (e.g., to a control system). The second encoder 192 can provide a signal indicative of the rotational position of the spindle assembly 110 (e.g., to a control system).

Figure 10:
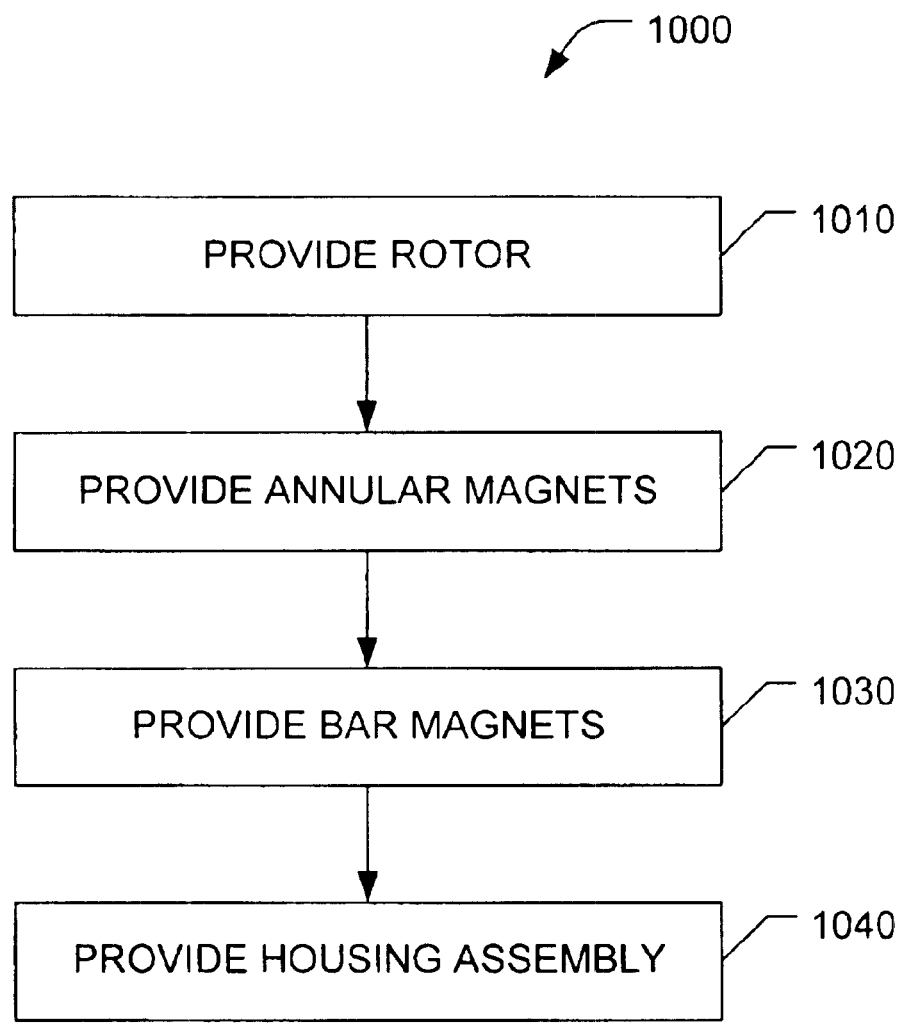
FIG. 10 is a flow chart of a method of manufacturing a rotary-linear actuator in accordance with an aspect of the present invention.
Figure 11:
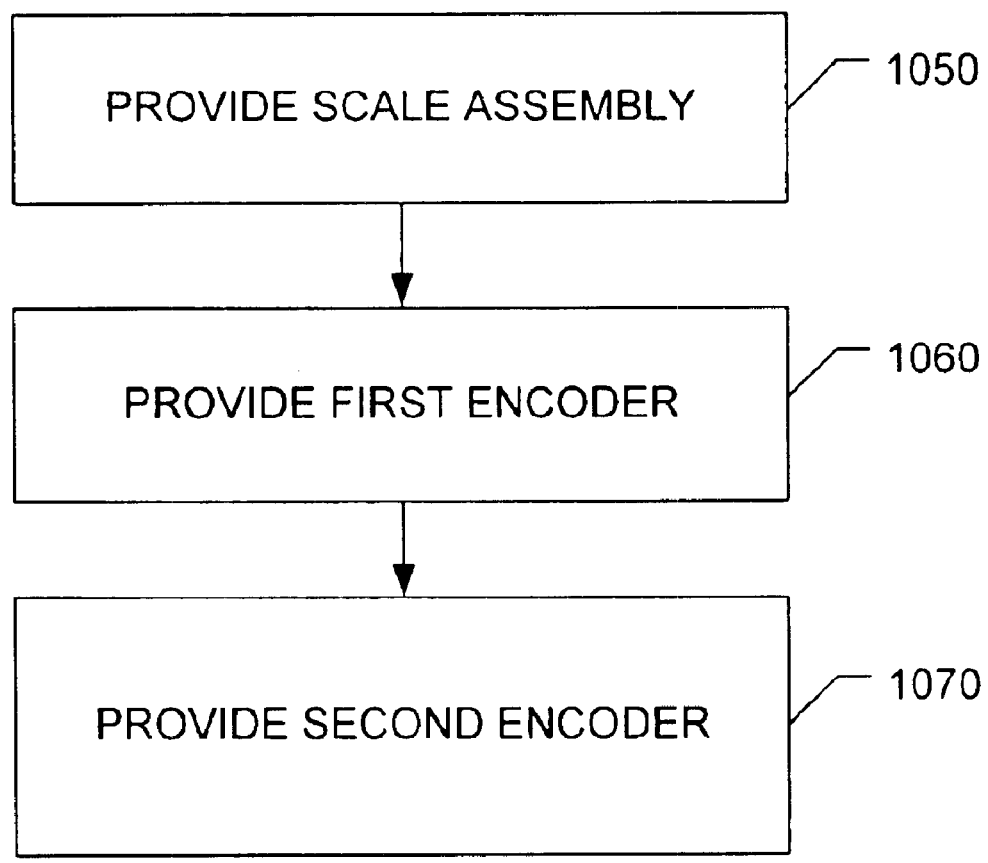
FIG. 11 is a flow chart of additional optional acts of the method of manufacturing illustrated in FIG. 10.
Figure 12:
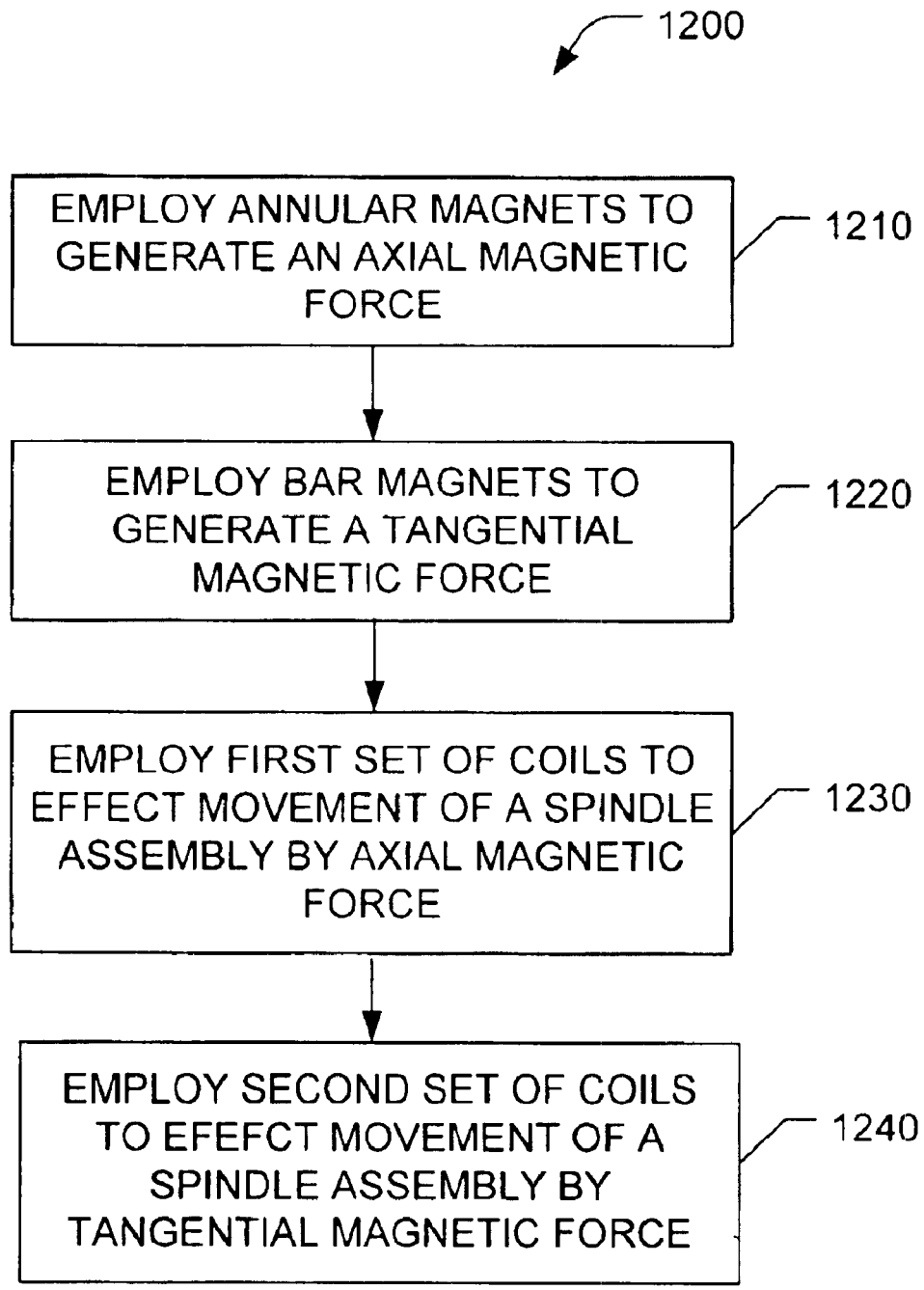
FIG. 12 is a flow chart of a method of using a rotary-linear actuator in accordance with an aspect of the present invention.

In view of the exemplary systems shown and described above, methodologies which may be implemented in accordance with the present invention, will be better appreciated with reference to the flow charts of FIGS. 10, 11 and 12. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. In addition, it will be appreciated that the exemplary methods 1100, 1200 and other methods according to the invention may be implemented in association with the system illustrated and described herein, as well as in association with other systems and apparatus not illustrated or described.

Referring next to FIG. 10, a method 1000 of manufacturing a rotary-linear actuator in accordance with an aspect of the present invention is illustrated. At 1010, a rotor 130 is provided. Thereafter, at 1020, a plurality of annular magnets 140 with alternating polarity generally surrounding at least a portion of the rotor 130 is provided. At 1030, a plurality of bar magnets 150 (e.g., conformably surrounding at least a portion of the rotor 120) is provided. At 1040, a housing assembly 120 having a motor shell 160, a first set of coil(s) 170 operative to apply an axial force on the plurality of annular magnets 140 and a second set of coil(s) 180 operative to apply a tangential force on the plurality of bar magnets 150 is provided.

Turning briefly to FIG. 11, additional optional acts of the method of manufacturing 1000 illustrated in FIG. 10 are illustrated. At 1050 a scale assembly 188 surrounding at least a portion of at least one of the plurality annular magnets 140 and the plurality of bar magnets 150 can be provided. At 1060, a first encoder 188 operative to sensing a linear position of the spindle assembly 110 can be provided. At 1070 a second encoder 192 operative to sensing a rotational position of the spindle assembly 110 can be provided.

Next, referring to FIG. 12, a method 1200 of using a rotary-linear actuator in accordance with an aspect of the present invention is illustrated. At 1210, a plurality of annular magnets 140, at least a subset of which circumferentially surround at least a portion of a rotor 130, to generate an axial magnetic force, are employed. At 1220, a plurality of bar magnets 150, at least a subset of which conformably surround at least a portion of the rotor 130, to generate a tangential magnetic force, are employed. At 1230, a first set of coil(s) 170, which, when energized effect movement of the spindle assembly 110 by axial magnetic force, is employed. At 1240, a second set of coil(s) 180, which, when energized effect movement of the spindle assembly 110 by tangential magnetic force, is employed.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A rotary-linear actuator, comprising:
    a spindle assembly comprising a singular central support and a rotor having a plurality of annular magnets with alternating polarity and a plurality of bar magnets, the spindle assembly movable along and rotatable about a longitudinal axis extending through the rotor; and
    a housing assembly comprising a coil system having coils arranged to, when energized, interact with the spindle assembly in at least one of a rotational mode and a linear mode.

2. The rotary-linear actuator of claim 1, the coil system further comprising a first set of coils arranged to apply an axial force on the plurality of annular magnets to drive the spindle assembly in a linear mode.

3. The rotary-linear actuator of claim 1, the coil system further comprising a second set of coils arranged to apply a tangential force on the plurality of bar magnets to drive the spindle assembly in a rotational mode.

4. The rotary-linear actuator of claim 1, the plurality of annular magnets circumferentially surrounding at least a portion of the rotor.

5. The rotary-linear actuator of claim 1, further comprising an air bearing between the support and the rotor.

6. The rotary-linear actuator of claim 1, each of the plurality of annular magnets comprising at least two parts.

7. The rotary-linear actuator of claim 6, at least one of the parts of the annular magnets having an arc angle in the range of about 45 degrees to about 360 degrees.

8. The rotary-linear actuator of claim 1, the plurality of bar magnets conformably surrounding at least a portion of the rotor.

9. The rotary-linear actuator of claim 8, at least one of the bar magnets having an arc angle in the range of about 15 degrees to about 180 degrees.

10. The rotary-linear actuator of claim 1, the spindle assembly further comprising a scale assembly.

11. The rotary-linear actuator of claim 10, further comprising a first encoder operative to sense a linear position off the spindle assembly.

12. The rotary-linear actuator of claim 11, the first encoder providing a signal indicative of the linear position of the spindle assembly.

13. The rotary-linear actuator of claim 10, further comprising a second encoder operative to sense a rotational position of the spindle assembly.

14. The rotary-linear actuator of claim 13, the second encoder providing a signal indicative of the rotational position of the spindle assembly.

15. A method of manufacturing the rotary-linear actuator of claim 1, comprising:
providing a rotor that circumferentially surrounds a central support;
providing a plurality of annular magnets with alternating polarity generally surrounding at least a portion of the rotor;
providing a plurality of bar magnets conformably surrounding at least a portion of the rotor;
providing a motor shell;
providing a first set of coils operative to apply an axial force on the plurality of annular magnets;
providing a second set of coils operative to apply a tangential force on the plurality of bar magnets.

16. The method of claim 15, further comprising providing a scale assembly surrounding at least a portion of at least one of the plurality annular magnets and the plurality of bar magnets.

17. The method of claim 16, further comprising providing a first encoder operative to sense a linear position of the spindle assembly.

18. The method of claim 16, further comprising providing a second encoder operative to sense a rotational position of the spindle assembly.

19. A method of actuating a rotary-linear motor, comprising:
employing a plurality of annular magnets, at least a subset of which circumferentially surround at least a portion of a rotor, to generate an axial magnetic force, the rotor surrounding a central support;
employing a plurality of bar magnets, at least a subset of which conformably surround at least a portion of the rotor, to generate a tangential magnetic force; and
employing an energized coil assembly and at least one of the axial magnetic force and tangential magnetic force to effect movement of the rotor.

* * * * *